(No Model.)
W. HETRICK & J. W. STIMMEL.
HARROW.
No. 308,360. Patented Nov. 25, 1884.
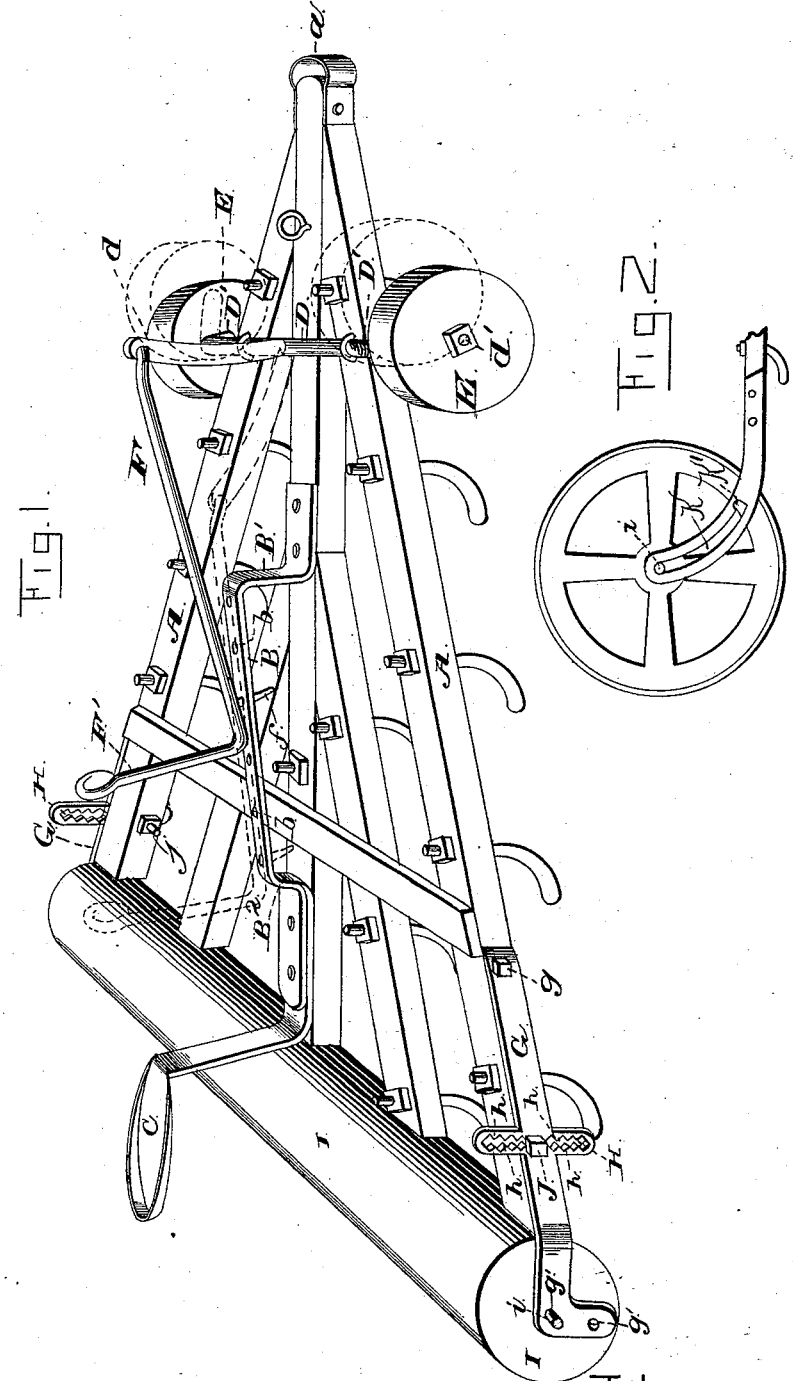
WITNESSES:
X. A. Clark.
P. B. Turpin,
INVENTORS
William Hetrick
Joseph W. Stimmel
By R. S. & A. P. Lacey
ATTYS

UNITED STATES PATENT OFFICE.

WILLIAM HETRICK AND JOSEPH W. STIMMEL, OF PORT ROYAL, PA.

HARROW.

SPECIFICATION forming part of Letters Patent No. 308,360, dated November 25, 1884.

Application filed May 17, 1884. (No model.)

*To all whom it may concern:*

Be it known that we, WILLIAM HETRICK and JOSEPH W. STIMMEL, citizens of the United States, residing at Port Royal, in the county of Juniata and State of Pennsylvania, have invented certain new and useful Improvements in Harrows; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to combined harrows and rollers.

The invention consists in certain novel constructions, combinations, and arrangements of the several parts, as will be hereinafter fully described, and pointed out in the claims.

In Figure 1 of the accompanying drawings the machine is shown in perspective, and Fig. 2 shows a modification of the construction whereby to vertically adjust the roller, presently described.

The harrow is preferably made in the triangular form shown, with its side bars, A, convergent at their forward ends, and provided with a clevis, $a$, or other suitable draft attachments. On the harrow, at about the middle, we mount the bar B, provided along its length with a series of perforations, $b$, and inclined downward from its forward to its rear end, for the purpose presently described. This inclination is preferably secured by making the connecting-arm B′ longer than the arm B², as clearly shown. The driver's seat C is supported on the rear end of the harrow, and extends back over the roller, presently described, so as to throw the driver's weight onto said roller, as will be understood. The shaft D is journaled on the forward end of the harrow, and is provided with a central upwardly-projected rod, $d$. Crank-arms D′ D′ are bent from the opposite ends of the shafts, and have the spindles $d'$, bent from their lower ends, on which the wheels E are supported, as shown. As the shaft D is rocked the wheels E will be thrown down to the point shown in full lines, so as to raise the harrow-teeth clear of the ground-surface, or to any desired point, as will be understood from the dotted lines, so as to vary the depth of cut, as will be understood. In order to conveniently manipulate this crank-shaft, as well as secure the same in any desired position, we provide the bar F, connected at its forward end to the upper or outer end of rod $d$, and having a pin, $f$, depending from its rear end in position to enter any one of perforations $b$. The handle F′ is bent upward from the rear end of the bar F, and is arranged in easy reach from the driver's seat. By inclining the perforated bar B downward it will be seen that the pin $f$ cannot be drawn out of openings $b$ by any forward strain on the bar F. The bars G are pivoted at $g$, near their forward ends, to the sides of the beams A of the harrow, and have their other ends extended in rear of the harrow and provided with a plurality or series of vertically-disposed bearings, $g'$ $g'$, in which the trunnions $i$ of the roller I may be supported, as will be presently described. The bars G are provided midway their ends with vertically-elongated ratchet-slots H, having their walls notched or serrated at $h$, as clearly shown. The bolts J are passed through the slots H and beams A and secured by suitable nuts, $j$. The bolt next its head is provided with an angular portion fitted to engage the serrations $h$ and hold the bar G at any desired point of adjustment. By means of this construction by loosening bolts J the roller I may be set up or down, the bar G being turned on its pivot $g$.

Instead of employing the ratchet or serrated slot the pivot $g$ may be loosened and the bars G sprung apart, so that the trunnions $i$ may be adjusted into the higher or lower holes, $g'$, as desired, so as to increase the pressure of said roller or throw the same sufficiently low to elevate the teeth clear of the ground. The normal position of the roller, it will be understood, is slightly lower than the harrow-teeth, so that when the wheels are thrown down the teeth will be cleared from the ground and the machine may be readily transported.

It will be understood that the vertical adjustment of the roller could be secured in various ways. In Fig. 2 we employ a curved bearing-bar and slot the same at K. At the lower end of this slot we form an offset or seat, K′, which is adapted to receive a bearing for the trunnion $i$ of the roller, and the roller may be adjusted into the head of the slot or into the seat or offset K', the head of the slot and the offset K' forming bearings for the roller, and arranged one above the other, as shown. We prefer, however, to employ the construction shown in Fig. 1, and before described.

Having thus described our invention, what we claim, and desire to secure by Letters Patent, is—

1. The herein-described combined harrow and roller, consisting of the harrow, the perforated bar B, inclined downward from its forward end, and mounted on the harrow, the bars G, secured on the harrow, and provided in their rear ends with a plurality of vertically-disposed bearing-holes, $g'$, the roller having its trunnions journaled in the openings $g'$, the crank-shaft D, having rod $d$, and the bar F, having pin $f$, substantially as set forth.

2. In a combined roller and harrow, the combination of the toothed frame, the roller journaled in its rear end and adjustable vertically, the detent-bar B, mounted on the toothed frame, the shaft D, journaled on the forward end of said frame, and provided with an arm, $d$, and depending crank-axles D', the wheels E, journaled on said crank-axles, and tie-rod F, connected with arm $d$, and adapted to engage bar B, the said wheels E and roller being adjustable independently of each other, substantially as and for the purposes specified.

In testimony whereof we affix our signatures in presence of two witnesses.

WILLIAM HETRICK.
JOSEPH W. STIMMEL.

Witnesses:
JOHN W. SPEDDY,
SAMUEL HETRICK.